UNITED STATES PATENT OFFICE.

HENRY H. BEACH, OF ROME, NEW YORK.

IMPROVEMENT IN PROCESSES OF SEASONING LUMBER.

Specification forming part of Letters Patent No. 107,854, dated October 4, 1870; reissue No. 4,384, dated May 16, 1871.

*To all whom it may concern:*

Be it known that I, HENRY H. BEACH, of the city of Rome, in the county of Oneida, State of New York, have invented an Improved Process of Seasoning Wood, of which the following is a specification:

The nature of my invention consists in subjecting wood to the direct action of a confined body of steam, of a temperature sufficiently high to completely coagulate the albumen contained in the wood, for a sufficient length of time to allow the steam to fully permeate the wood, and then withdrawing it from the steam before its action has perceptibly injured the quality of the wood, it having been discovered by me that when wood is thus immersed in confined steam of a pressure due to the temperature above indicated, it being quickly permeated by the heat, whereby the moisture it contains is converted into steam, and thereby, in great measure, expelled, while the solid constituents of its natural sap are retained solidified and rendered highly insoluble and impervious to water, the seasoning process is almost instantly accomplished, it also having been discovered by me that when the steam, of the pressure above stated, has permeated with its heat every part of the wood, it has performed all the beneficial office in the seasoning process of which it is capable, and a longer continuance of its action is injurious to the wood; and that if, when the above-desired effect has been fully produced, the wood is immediately withdrawn from the action of the confined steam and its residual moisture—the same being the condensed steam contained in it when so withdrawn—is allowed to escape in the atmosphere, which, from inch pine boards, under favorable conditions, it will do in ten to twenty days, not only is the wood thereby thoroughly dried without receiving injury, but certain novel and valuable changes are effected in it, namely, it is rendered firmer, more solid, less brittle, and heavier, will absorb moisture less rapidly, and, consequently, is less liable to be affected by atmospheric changes, or the action of heat or moisture, than wood seasoned by any process hitherto employed of which I have knowledge.

An apparatus suitable for carrying out my improved process consists of a tank or vessel for receiving the lumber to be treated and a steam-pipe for supplying the requisite steam. The tank may be of cylindrical or other form, and should be of sufficient strength to resist the steam-pressure to which its contents are to be subjected. One end should be provided with a hinged door, closing steam-tight and provided with suitable means for holding it closed against the outward pressure of the steam. A truck upon which the charge of lumber may be piled, and a rail track by which said truck may be run out from or into the tank, should also be provided for convenient handling of the lumber.

The pipe connecting the steam-boiler with the tank should be provided with a throttle-valve or cock, by which the communication can be opened or closed at pleasure, and a blow-off pipe and valve should be arranged for the discharge of the steam from the tank after a charge of lumber has been subjected to its action for the required length of time. A small stop-cock should also be inserted in the bottom of the tank for the discharge of the condensed steam and sap.

The operation of charging the tank with lumber is simple and obvious. When the charge of lumber is properly introduced into the tank and the tank closed, the steam is admitted thereto until it is filled with steam and the requisite pressure is obtained. The lumber is allowed to remain in the confined steam long enough to produce the effect before described, and it is then withdrawn by an obvious operation.

I have demonstrated by trial and experiment that steam of a pressure of thirty to forty pounds per square inch will, in five to ten minutes, produce the desired effect, as herein described, upon pine boards one inch thick, and therefore advise the use of steam of about that pressure. For thicker lumber or wood in larger masses, the action of the steam must be continued proportionally longer; but even upon pine lumber three inches thick the action of the steam for fifteen minutes will usually be found sufficient. Harder lumber will require proportionally longer time, the object being to raise the temperature of the wood throughout to that of the steam, and when it has fully permeated the wood that object is accomplished. The wood should then be withdrawn from the steam and the moisture which remains be permitted to escape in the atmosphere. The injurious effect of the continued action of the steam after it has performed its office, as herein specified, will not, of course, be immediately perceptible; but if the action is prolonged for any considerable time—say, for an hour or more—and especially if steam of very high pressure—for example, seventy pounds to the square inch or over—the wood will be thereby checked and discolored, and its quality injured. The best result is therefore obtained when the wood is withdrawn from the confined steam immediately after the temperature has been raised to that of the steam. The skillful operator will soon learn by practice at what point of time to suspend the action of the steam.

The albumen of wood is not as thoroughly coagulated as is desirable in this process by less than about 200° Fahrenheit. Steam should therefore be used of a pressure involving at least this degree of heat; and as a higher heat than, say, 260° or 280° is liable to injure the wood, I would recommend the use in no case of steam with more than fifty to sixty pounds' pressure to the square inch. As before stated, thirty to forty pounds' pressure to the square inch is safer and more convenient.

I am aware that wood has been subjected to the action of steam as one step in the process of seasoning the same; but I am not aware that the operation has ever been conducted as herein described, so as to produce the above-described results.

I do not, therefore, claim broadly, as my invention, the application of the direct action of steam for the seasoning of wood; but What I do claim as my invention is—

The process which consists in subjecting wood to the action of confined steam under a pressure, and for a time sufficient to produce the effects substantially as herein set forth, and then withdrawing it from the action of the confined steam before such action perceptibly injures the quality of the wood.

HENRY H. BEACH.

Witnesses:
T. B. CLARKSON,
HENRY R. TIFFT.